INVENTOR.
RALPH M. ADLER
BY
Thomas J. Moran
ATTORNEY

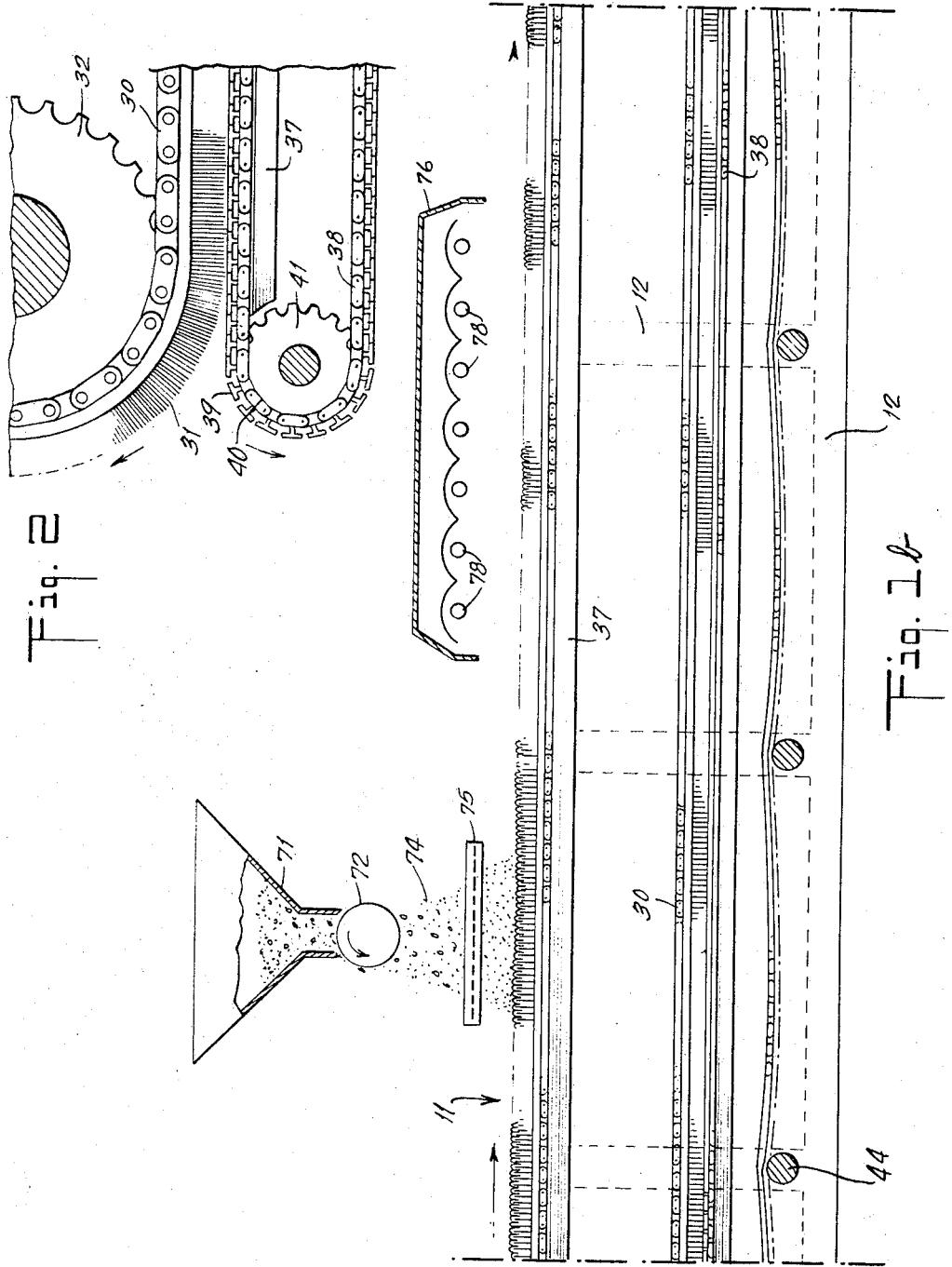

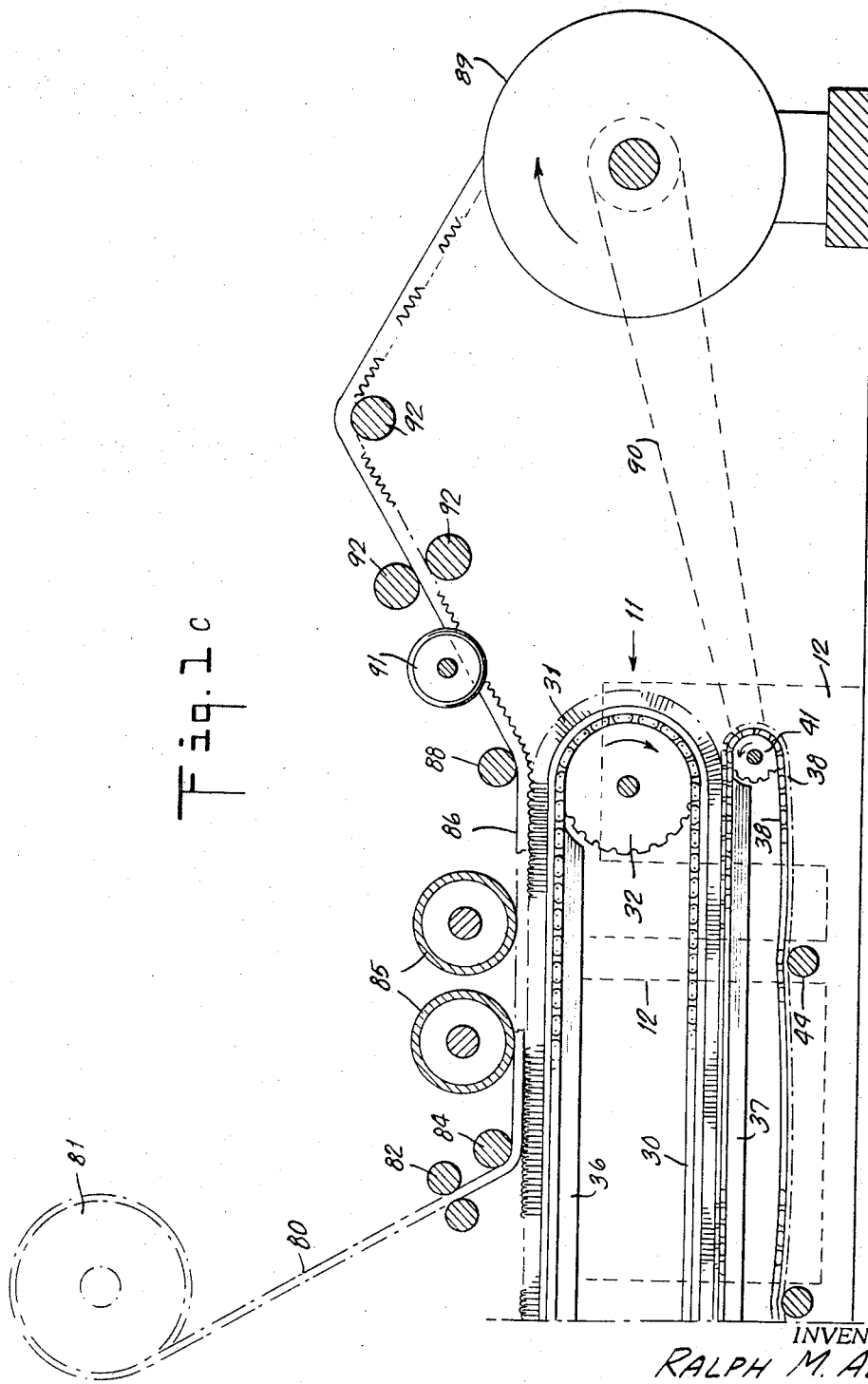

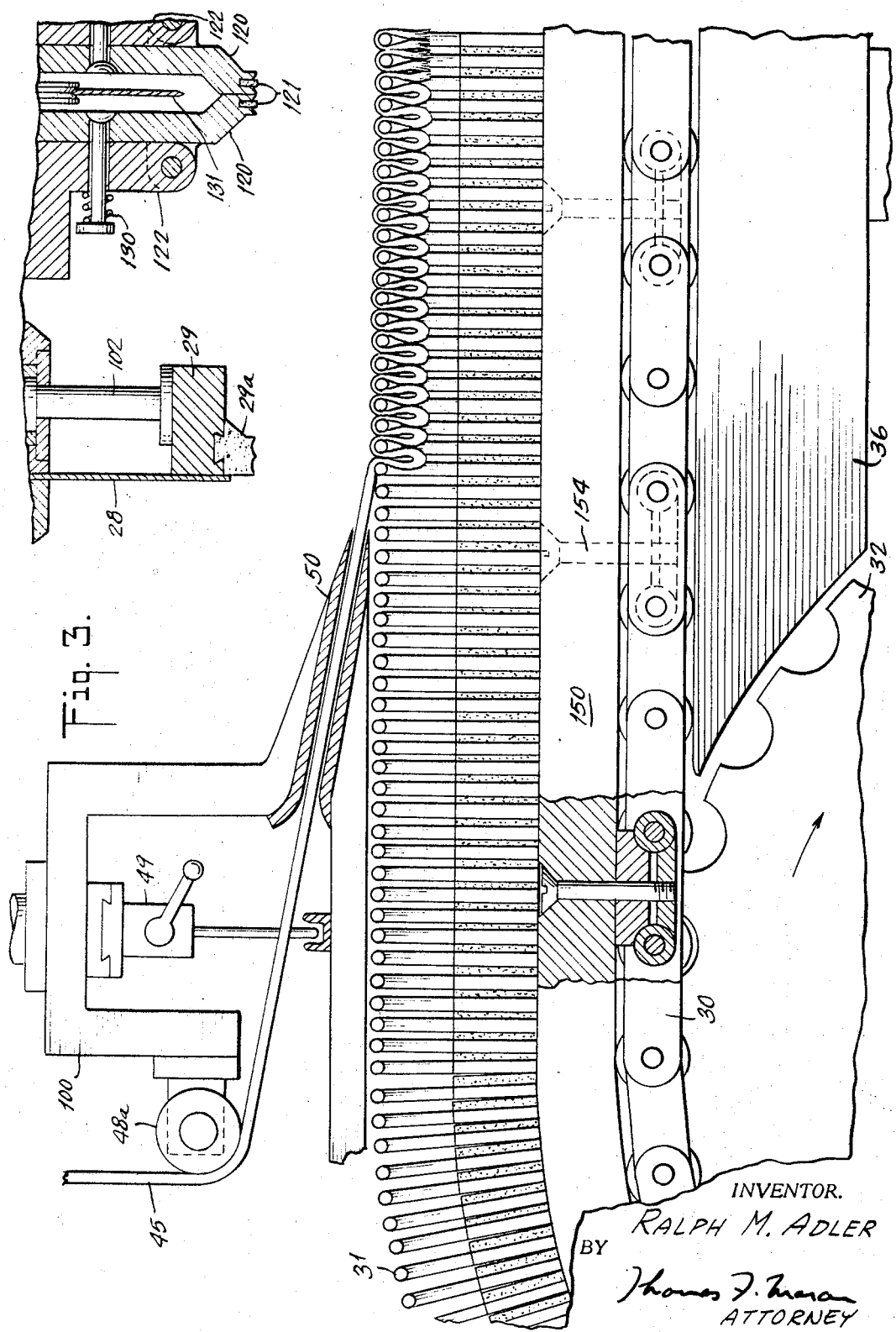

INVENTOR.
RALPH M. ADLER

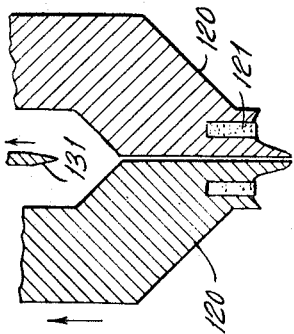
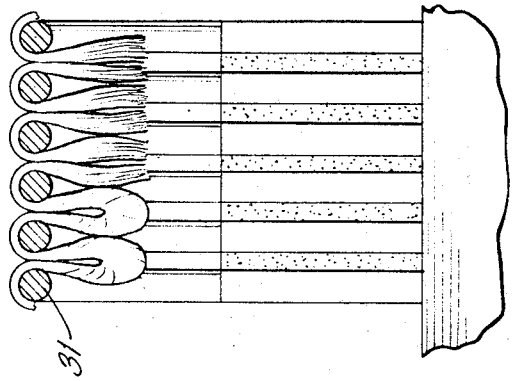
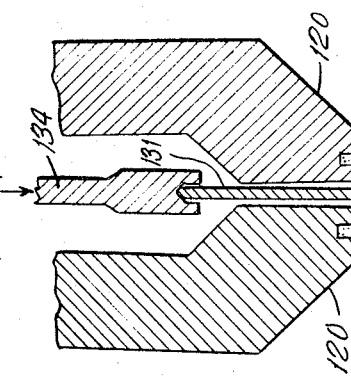
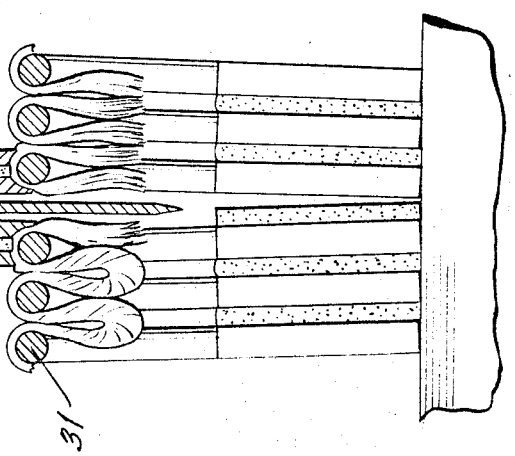
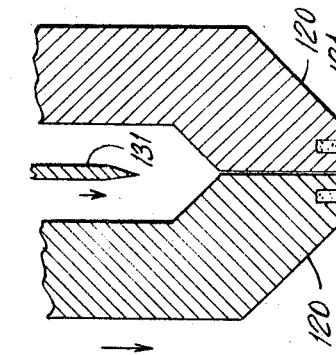
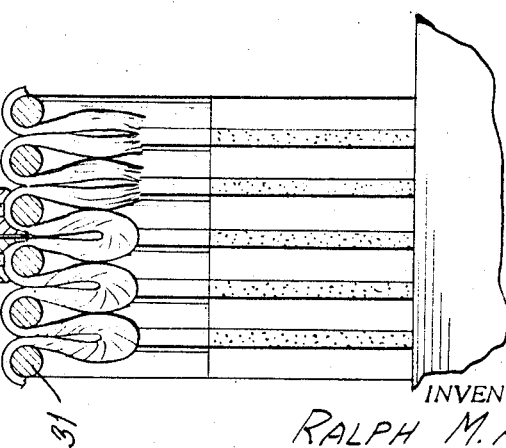
INVENTOR.
RALPH M. ADLER
BY
Thomas F. Moran
ATTORNEY

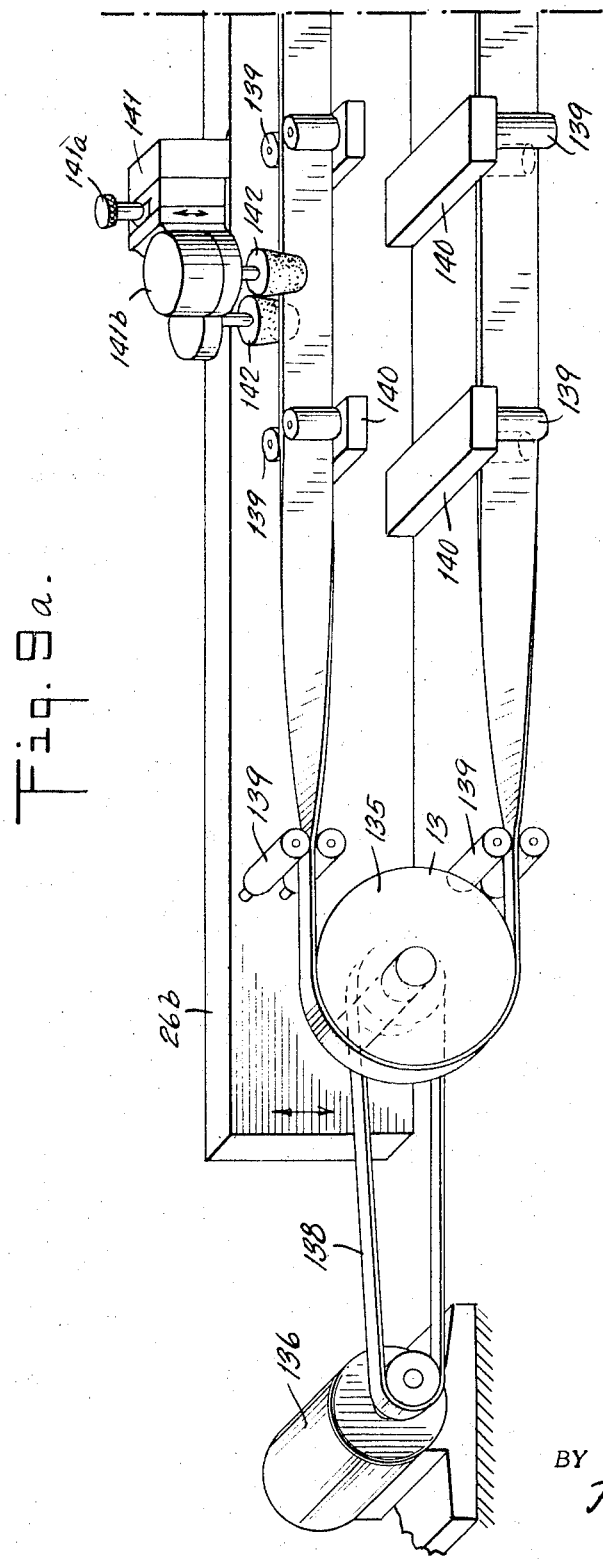

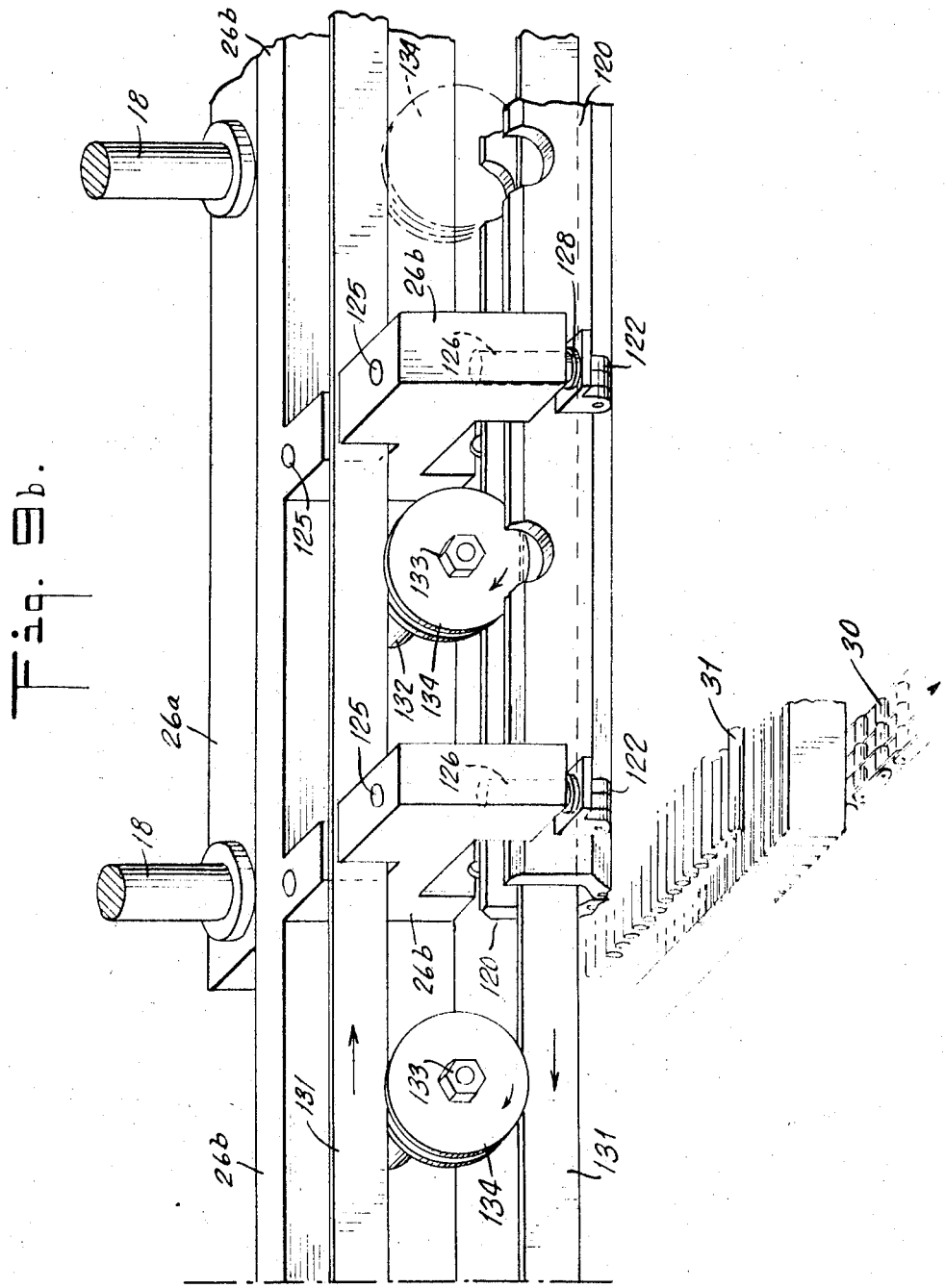

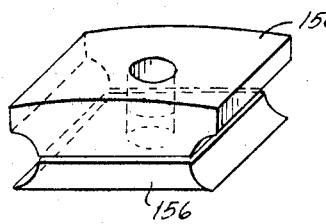
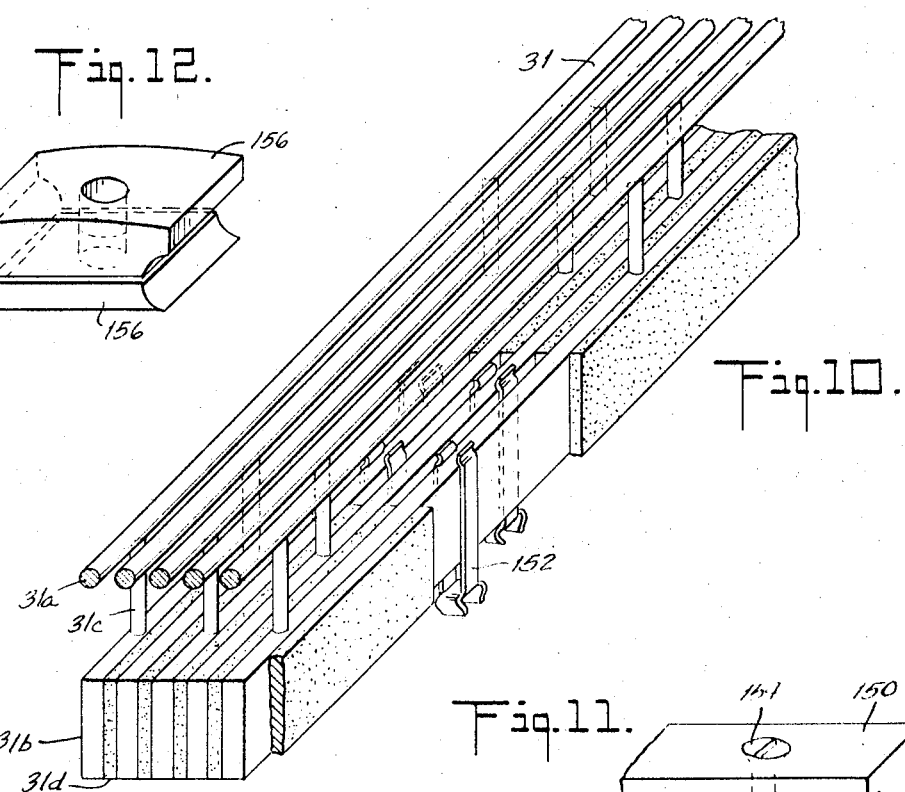
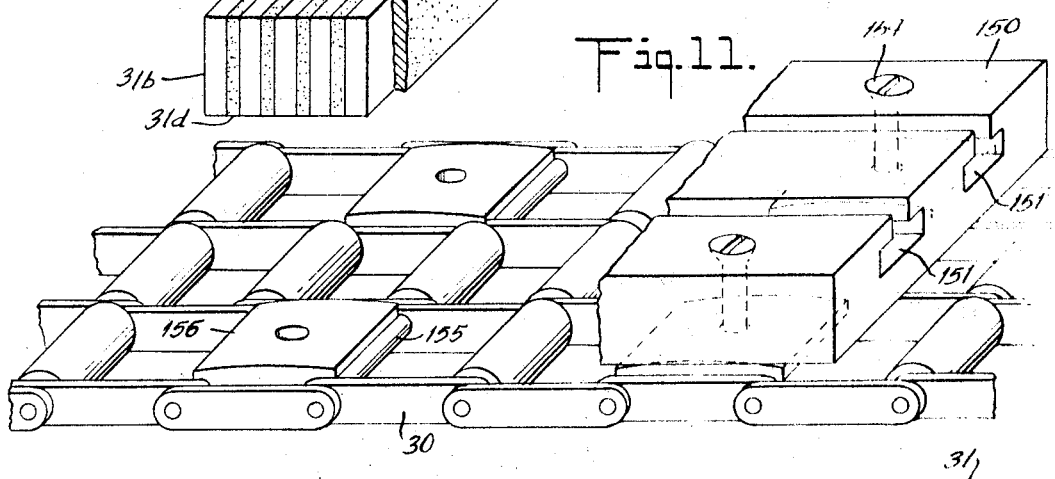
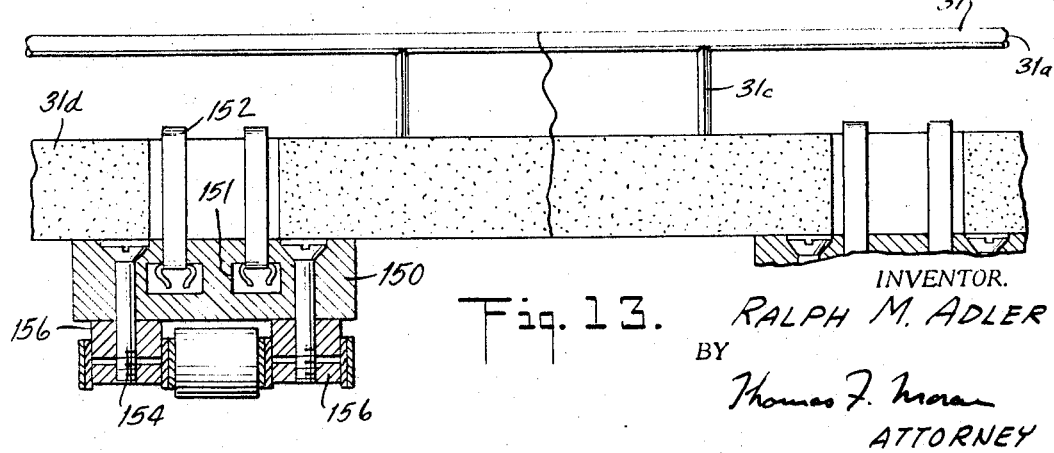

United States Patent Office 3,424,632
Patented Jan. 28, 1969

3,424,632
METHOD AND APPARATUS FOR PRODUCTION OF PILE CARPETING AND THE LIKE
Ralph Michael Adler, Kew Gardens, N.Y., assignor to Adler Process Corp., New York, N.Y., a corporation of New York
Filed Jan. 13, 1966, Ser. No. 520,402
U.S. Cl. 156—72          19 Claims
Int. Cl. D04h 11/04

This invention relates to pile fabrics. More particularly, this invention relates to pile fabrics, such as carpeting, rugs and the like, and to a method and apparatus useful for producing the same.

Various methods and apparatus have been employed for the production of pile fabrics, such as carpeting and rugs. Those methods and apparatus employing a weaving technique are capable of producing quality pile fabrics having a dense pile and long service or wearing life. Woven pile fabrics, however, are relatively expensive to produce and as a result woven pile fabrics are costly.

Pile fabrics and carpeting have also been prepared by utilizing non-weaving techniques, such as by knitting and by tufting. Pile fabrics produced by such techniques, however, generally exhibit a relatively loose pile and are less pleasing in appearance. Such pile fabrics, however, are capable of being produced at a relatively high rate and are usually less expensive as compared with woven pile fabrics.

The textile industry, particularly that portion thereof involved in the production of pile fabrics, such as carpeting and rugs, has long been interested in a fast, practical, inexpensive method and apparatus for the production of pile fabrics having a relatively dense pile and exhibiting a long wearing life and simulating a woven pile fabric. Techniques employed and suggested heretofore for the manufacture of such non-woven fabrics, however, have not been entirely satisfactory.

In copending, coassigned patent application Ser. No. 301,425 filed in the name of Solomon Adler on Aug. 12, 1963, and entitled "Pile Fabric and Method and Apparatus for Producing Same," now U.S. Patent No. 3,309,252 there is disclosed a method and apparatus for the production of a non-woven pile fabric. The invention described herein is an improvement on the invention described in the above-identified application. The disclosures of the above-identified patent application are herein incorporated and made part of this disclosure.

Although the technique of making pile fabrics by forming loops of yarn between spaced, parallel, slat-like machine elements or loop-forming members, such as disclosed in the above-identified patent application has been investigated, there has been relatively little commercial utilization of such methods and apparatus. Apparently the previously known and suggested techniques have failed to meet the very demanding requirements of a commercially acceptable operation. To gain commercial acceptance methods and apparatus for the production of non-woven pile fabrics must be capable of rapidly and continuously producing pile fabrics from diverse materials, natural and synthetic fibers, and of spun, twisted or monofilament yarns and in a variety of controlled pile heights, densities and patterns without requiring extensive alteration of the apparatus and basic method.

Accordingly, it is an object of this invention to provide a method and apparatus for the production of pile fabric suitable for use as carpeting, rugs and the like and at a relatively high rate of production.

It is another object of this invention to provide an improved method and apparatus for the production of pile fabrics.

It is another object of this invention to provide a process and apparatus capable of producing pile fabric of uniform quality and at a production rate substantially in excess of that presently attainable for similar pile fabric.

In at least one embodiment of this invention at least one of the foregoing objects will be achieved.

How these and other objects of this invention are achieved will become apparent in the light of the accompanying disclosure made with reference to the accompanying drawings wherein:

FIGS. 1a, 1b and 1c each illustrate schematically and in partial cross section portions of an apparatus in accordance with this invention for the production of pile fabrics and the like;

FIG. 2 is an enlarged fragmentary cross sectional view of elements of the apparatus of this invention illustrated in FIG. 1a;

FIG. 3 is a fragmentary cross sectional view of portions of elements of the apparatus of this invention illustrated in FIG. 1a and showing the relationship of the feeding, the loop-forming and the loop-cutting elements;

FIGS. 6, 7 and 8 show fragmentary cross sectional views of the loop-cutting element in accordance with this invention and illustrate the sequence of operations of this element;

FIGS. 9a and 9b illustrate in fragmentary perspective views the loop-cutting element in accordance with this invention;

FIG. 10 illustrates in perspective and partial cross section an array of the loop-forming members in accordance with this invention;

FIG. 11 is a fragmentary view of the carrier structure for the loop-forming elements in accordance with this invention;

FIG. 12 illustrates a supporting block in the carrier structure of the loop-forming elements; and FIG. 13 is a fragmentary, cross sectional view showing the disposition of the loop-forming elements in accordance with this invention.

Figure 1A:
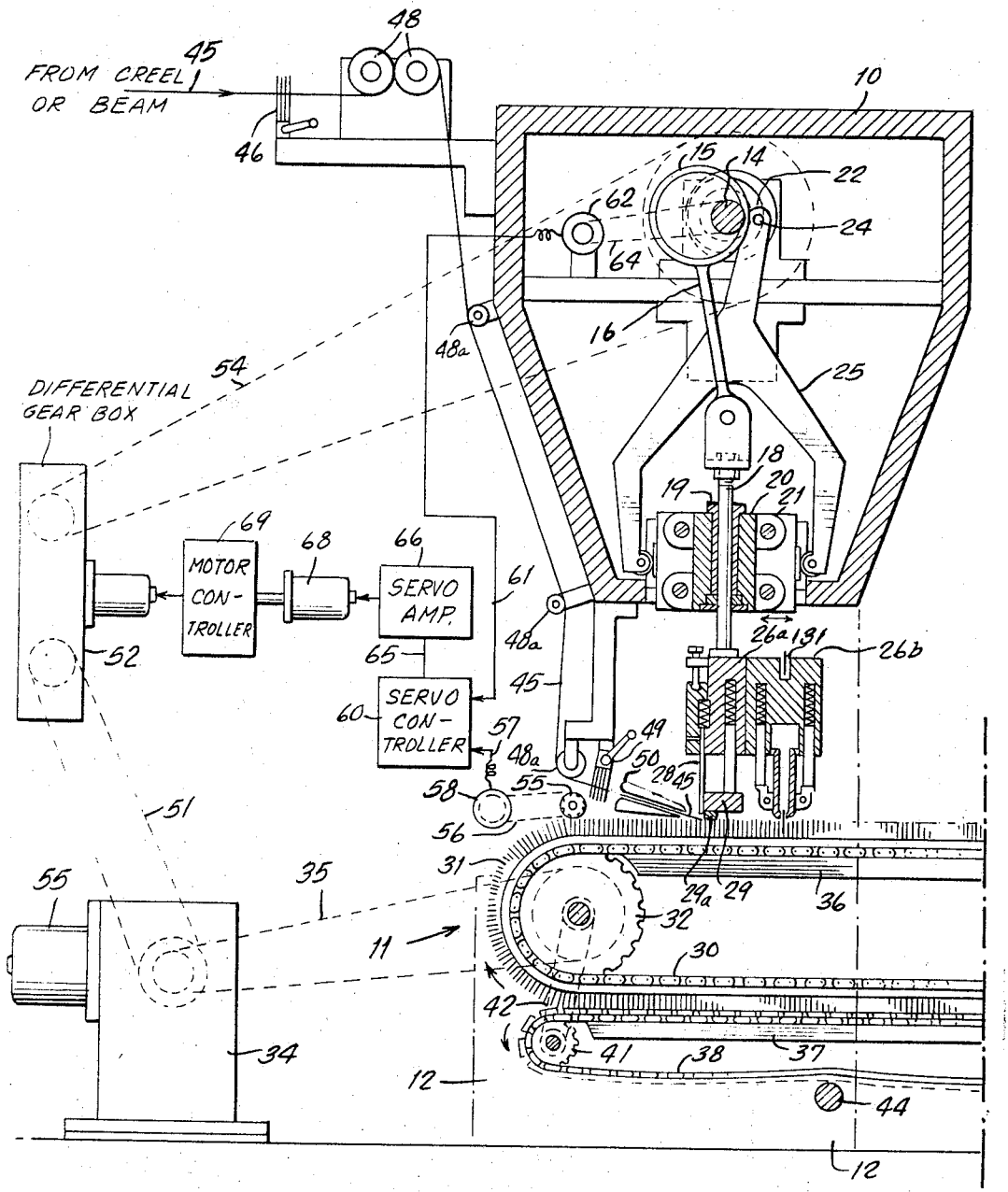

In accordance with this invention there is provided a method and apparatus for the manufacture of pile fabrics useful as carpeting, rugs and the like. The pile of the fabric is produced by forming loops of yarn between slat-like loop-forming elements. The loop-forming elements are arranged in a closed loop array in parallel side-by-side arrangement. The loops formed between the loop-forming elements are then, if desired, cut and a backing material applied thereto. Thereupon, the resulting pile fabric is removed from the array of loop-forming elements.

Desirably, the array of loop-forming elements is moved continuously and as the array of loop-forming elements moves beneath a loop-forming station a blade-like member descends so as to press warp material which is continuously supplied to said loop-forming station between adjacent loop-forming members directly beneath the blade-like member. When the warp material is pressed by the blade-like member between the loop-forming members to form loops of warp material therebetween, the blade is withdrawn and the loop-forming members retain the thus-formed loops. The above sequence of operations is repeated with the array of loop-forming members continuously moving and the blade intermittently descending between successive loop-forming members. The thus-formed loops are securely retained as the array of the loop-forming members moves. Subsequently, if desired, the loops are cut and adhesive and/or backing material applied thereto. After a suitable length of travel the loops, now bound to the backing material, are removed from the array of loop-forming members as the substantially finished pile fabric.

The design and operation of the array of the slat-like, loop-forming members to yield a commercially acceptable operation and a satisfactory product are difficult, particularly when it is realized that it is commercially desirable to produce continuous length pile fabric having a width of about 15 feet.

The slat-like, loop-forming members making up the closed array must be in closely arranged parallel relationship with the pitch or center-to-center distance between successive loop-forming members being approximately 3/16 inch. As a result it is apparent that when the slat-like, loop-forming members are long, thin members measuring approximately 15 feet in length they must have substantial depth to prevent sagging. Because of the construction and dimensions of the slat-like, loop-forming members and the resulting array, means must also be provided to provide proper support, alignment and transport of the loop-forming members and the array.

Also, means must be provided for synchronizing the arrival of the slat-like, loop-forming members at the loop-forming station so as to assure proper positioning of the loop-forming members relative to the blade which descends to press the warp material between adjacent loop-forming members to form loops of warp therebetween. If the loop-forming members are disposed and arrayed in a rigid, fixed, parallel, spaced relationship with respect to each other, at best, only a given thickness of warp material or yarn will be accommodated and satisfactorily retained therebetween. Thinner warp material or yarn will tend to leave or escape from between the loop-forming members. Thicker warp material or yarn would require excessive force to act upon the blade to force the warp material between the loop-forming members. Such excessive force would tend to cause yarn damage and breakage and the resulting formed loops would tend to force or wedge the loop-forming members apart into a non-parallel relationship which would become cumulative such that each succeeding slat-like, loop-forming member would arrive at the loop-forming station with a successively greater tilt until the space available between adjacent loop-forming members would become too narrow for continued operation. For example, in the manufacture of a commercially acceptable pile fabric, useful as carpeting, the pitch of the loop-forming members is approximately 3/16 inch with about 1/16 or 1/8 inch spacing between the loop-forming members. Such an arrangement would call for an array of about 68 slat-like, loop-forming members per linear foot of the array. Since the overall closed loop array in accordance with this invention would usually require over a thousand, even thousands, of loop-forming members it should be readily appreciated that even a small cumulative tilt would soon cause the overall apparatus to be inoperative. Even when the slat-like, loop-forming members are disposed in a hinged substantially parallel relationship, which arrangement would require force to be continuously applied to the array so as to retain the looped warp material between the loop-forming members, the total aggregate force required, if supplied from outside the structure by means of springs and the like, becomes enormous and substantially impractical of achievement by such means.

In accordance with this invention, however, the slat-like, loop-forming members are constructed and disposed such that the forces necessary to retain the loop-forming members in the desired array and also to retain the looped warp material therebetween are provided by the loop-forming members per se. Also, in accordance with this invention the slat-like, loop-forming members are capable of being readily spread apart to permit the forcing of the warp material therebetween by the descending blade at the loop-forming station and to yield resiliently and to accommodate various size warp material. These features are achieved in accordance with this invention by imparting magnetic properties to the slat-like, loop-forming members. For example, the slat-like, loop-forming member is made of magnetic material or has magnetic material fixed or otherwise attached thereto such that the loop-forming member attracts adjacent loop-forming members with the result that the array of the loop-forming members is magnetically held together. The magnetic attraction of the loop-forming member to its adjacent loop-forming member provides the force for retaining the looped warp material therebetween. At the same time the magnetic attraction between adjacent loop-forming members permits these members to be, in effect, hingedly separated to readily accommodate the entry of the blade and looped yarn therebetween during the loop-forming operation. This essential feature of the invention, to which feature is attributable all the advantages and the unique operation of the apparatus of this invention, is more clearly and precisely described hereinafter.

Referring now to the drawing, particularly FIGS. 1a, 1b and 1c which illustrate the apparatus and mode of operation of the invention and elements thereof, there is illustrated housing 10 disposed atop and transversely straddling the conveyor system, generally indicated by the reference numeral 11, which is supported by frame 12. Main shaft 14 is rotatably mounted and journaled within housing 10 and carries eccentric 15 which reciprocates crank 16 and yoked push rod 18. Push rod 18 reciprocates within slide bearing 19 provided within bearing housing 20 which is mounted on slideway 21.

Constant velocity groove cam 22 mounted associated with main shaft 14 in timed relationship with eccentric 15 acts through follow roller 24 and rocking yoke lever 25 to reciprocate bearing housing 20 horizontally. Yoked push rod 18 is thereby caused to describe a compound motion in the form of a narrow ellipse having a vertical major axis for each complete rotation of main shaft 14 in which the horizontal component or velocity is constant from left to right as illustrated for the working half of the stroke. Loop-forming blade 28 and presser foot 29 including resilient presser foot head 29a are mounted upon carrier beam 26a.

Endless conveyor chain 30 carrying loop-forming members 31 is continuously moved by sprockets 32 which in turn are drive by main drive 34 by means of drive chain 35. Sprockets 32 are driven at a uniform speed to move conveyor chain 30 carrying with it the array of loop-forming members 31 in the manner indicated.

With the array of loop-forming members 31 which has considerable weight conveyor chain 30 moves along support rail 36 of conveyor frame 12. Support for the lower or returning section of conveyor chain 30 and the lower or returning section of the array of loop-forming members 31 is provided by support chain platform 38 which is shown in greater detail in FIG. 2 wherein support chain platform 38 is shown provided with platform sections 39 at each link 40 making up support chain platform 38. Platform sections 39 assume a flat, planar conformation directly beneath and in contact with lower or returning section of the array of loop-forming members 31 to support the array and to maintain the loop-forming members 31 straight and without any sagging. Further, support chain platform 38 is similarly mounted as main conveyor chain 30 and moves in synchronism therewith by means of sprockets 41 and drive chain 42. Support chain platform 38 moves and is supported on rail 37 of frame 12 and as a result the weight of the conveyor system carrying the array of loop-forming members 31 is transmitted to frame 12. Rollers 44 rotatably mounted on frame 12 support and guide the lower or return section of support chain platform 38.

Carrier beam 26a carries loop-forming blade 28 which is adapted and positioned to descend between adjacent loop-forming members 31 as they continuously move beneath blade 28 with the result that warp material 45 is pressed between loop-forming members 31 to form loops therebetween.

Warp material 45 is supplied from a suitable source, such as a creel or beam, not shown, through adjustable reed 46 along guide rolls 48 and through final adjusting reed 49 and guide 50. The synchronization of the downward movement of blade 28 with the motion and position of the loop-forming members 31 at the loop-forming station directly beneath blade 28 so as to assure that warp material 45 is pressed downwardly by blade 28 between loop-forming members 31 is effected by any suitable means. As schematically illustrated in FIG. 1a main shaft 14 is shown driven by main drive 34 via chain 51, differential gear box 52 and chain 54, main drive 34 being driven by suitable means, such as electric motor 55. To assist in maintaining the correct synchronism between downward movement and motion of blade 28 and the motion of loop-forming members 31 and to assure that blade 28 descends between loop-forming members 31 and to compensate for the variations in spacings between loop-forming members 31 in the moving array and for thermal expansion and the like, a compensating drive system is provided.

In the compensating drive system any additive or subtractive errors in the position of the loop-forming members 31 beneath blade 28 are detected by sprocket wheel 55 which engages in pinion-like fashion loop-forming members 31 a short distance before the loop-forming station. Sprocket wheel 55 through chain 56 drives rotating reference transducer 58. Errors in the motion of loop-forming members 31 are detected by sprocket wheel 55 and cause changes in the output signal from transducer 58 proportional to said errors. Signals derived from tranducer 58 may be a voltage signal, a frequency signal or other variable quantity as desired. Signal 59 from transducer 58 is sent to servocontroller 60 wherein it is compared with another signal 61 generated by transducer 62 actuated via chain drive 64 by the rotational speed of main shaft 14. When signals 59 and 61 supplied to servocontroller 60 are identical in value the operation of the machine is normal and the synchronism of the motion and position of loop-forming members 31 relative to the motion and position of presser blade 28 is correct or satisfactory. If the signals 59 and 61 are not identical or do not match, an appropriate correction output signal 65 is generated by servocontroller 60 and amplified in servoamplifier 66 and supplied to servomotor 68 and motor controller 69 to vary the output speed of differential gear box 52. When the difference between signals 59 and 61 is eliminated the corrective action ceases.

Rather than driving and controlling the motion and synchronism of the array of loop-forming members 31 and presser blade 28 in the manner indicated, blade 28 may be mounted for movement in a vertical direction only. Also, main shaft 14 may be mounted such that it does not continuously rotate but only rotates when space between adjacent loop-forming members 31 is available beneath presser blade 28. Such a system will comprise a photoelectric cell device of the reflective type including a light source and a detector which senses the presence of loop-forming members or spaces therebetween due to differences in the amount or other quality of the reflected light. The signal produced by such a photoelectric cell device would operate a relay system which in turn would energize an electromagnetic or other suitable clutch assembly operatively connected to main shaft 14. When actuated, main shaft 14 would be caused to rotate at a high speed for a single rotation only. Presser blade 28 would then be actuated to perform a single loop-forming cycle, following which it would return to its upper position and await the arrival of the next, successive space between loop-forming members 31. Such an arrangement would correct for any errors or variations which may exist in conveyor speed or construction, etc. since the downward or reciprocating motion of presser blade 28 would be triggered only by the arrival and detection of an available space between loop-forming members 31 at the loop-forming station. By driving main shaft 14 at a sufficiently high speed for a single rotation the loop-forming operation would be completed in an extremely short period of time during which the movement of the array of loop-forming members 31 would be insignificantly small.

In the operation of the device illustrated in FIGS. 1a, 1b or 1c for the manufacture of pile fabric, yarn 45 from a suitable source, such as a beam or creel, not shown, is drawn through adjustable expansion cone or reed 46 by feed rolls 48 and then over guide rolls 48a through adjustable expansion reed 49 and between guide plates 50 by the action of presser blade 28 and presser foot 29 and presser foot head 29a which act in combination when blade 28 intermittently descends between loop-forming members 31 to form loops therebetween. There is thus formed an array of loops from yarn 45 between loop-forming members 31 which moves along with the array of the loop-forming members.

The array of loops, thus-formed, moves beneath carrier beam 26b wherein the loops are cut by cutting blade 70 which is mounted on carrier beam 26b. Carrier beam 26b is fixed to carrier beam 26a and adapted to move in synchronism therewith such that as blade 28 carried by carrier beam 26a descends to form a loop between loop-forming members 31 carrier beam 26b also descends and by means of cutting blade 70 cuts the loops previously formed between loop-forming members 31. The operation of cutting blade 70 in association with carrier beam 26b is described hereinafter.

Following the formation and cutting of the loops, and referring now particularly to FIG. 1b, suitable film forming binder material, such as thermoplastic material useful as a binder, is distributed from hopper 71 via a rotary distributing device 72 located at the bottom of hopper 41 to distribute particle-form thermoplastic binder material 74 onto sifter or screen 75 from which it falls onto the top surface of the array of cut yarns or loops. The resulting plastic coated cut yarns or loops, the top surface of which is covered with thermoplastic binder material 74, such as polyvinyl chloride, including PVC plastisol, polyethylene or polypropylene-containing material and the like, then passes beneath bank 76 of infra-red ray heating elements 78. As the thermoplastic material moves beneath the bank 76 of heating elements 78 the thermoplastic material is softened and becomes fluent and tends to coat the top surface of the cut yarn loops with a fluent adhesive layer of plastic material.

Referring now to FIG. 1c, backing material 80, such as burlap, is supplied from roll 81 through feed rolls 82 and guide roll 84 onto the hot fluent thermoplastic material on the top surface of the cut yarn loops. The burlap backing material is then pressed into firm adhesive contact with the hot fluent thermoplastic material by means of pressure rolls 85 to form a firm bond between the burlap backing material, the thermoplastic material and the cut yarn loops. Advantageously, pressure rolls 85 are also chilled to set or solidify the fluent thermoplastic adhesive material more quickly. The resulting pile fabric structure 86 comprising cut yarn loops, a coating of thermoplastic material and a burlap backing is removed from the array of loop-forming members 31 by passing under guide roll 88. The pile fabric is pulled by wind up roll 89 which is driven in synchronism with sprocket 41 via chain drive 90. Trimming rotary knife blade 91 removes excess pile fabric material and the trimmed pile fabric then moves over guide rolls 92 onto the take up or wind up roll 89 from which it is subsequently removed as a substantially finished pile fabric product.

Figure 4:
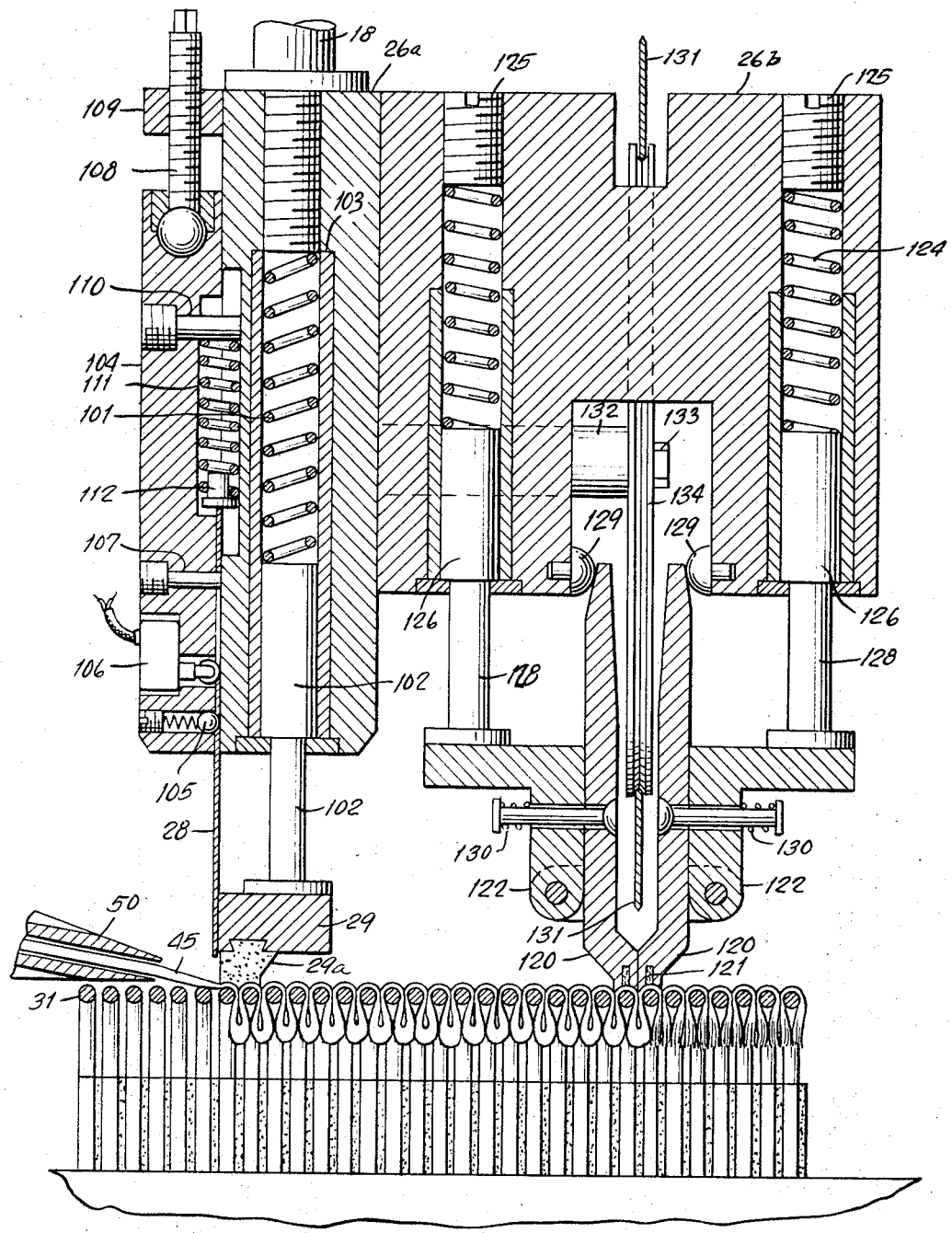
FIGS. 4 and 5 illustrate in cross section and in greater detail the loop-forming and loop-cutting elements of the apparatus of this invention.
Figure 5:
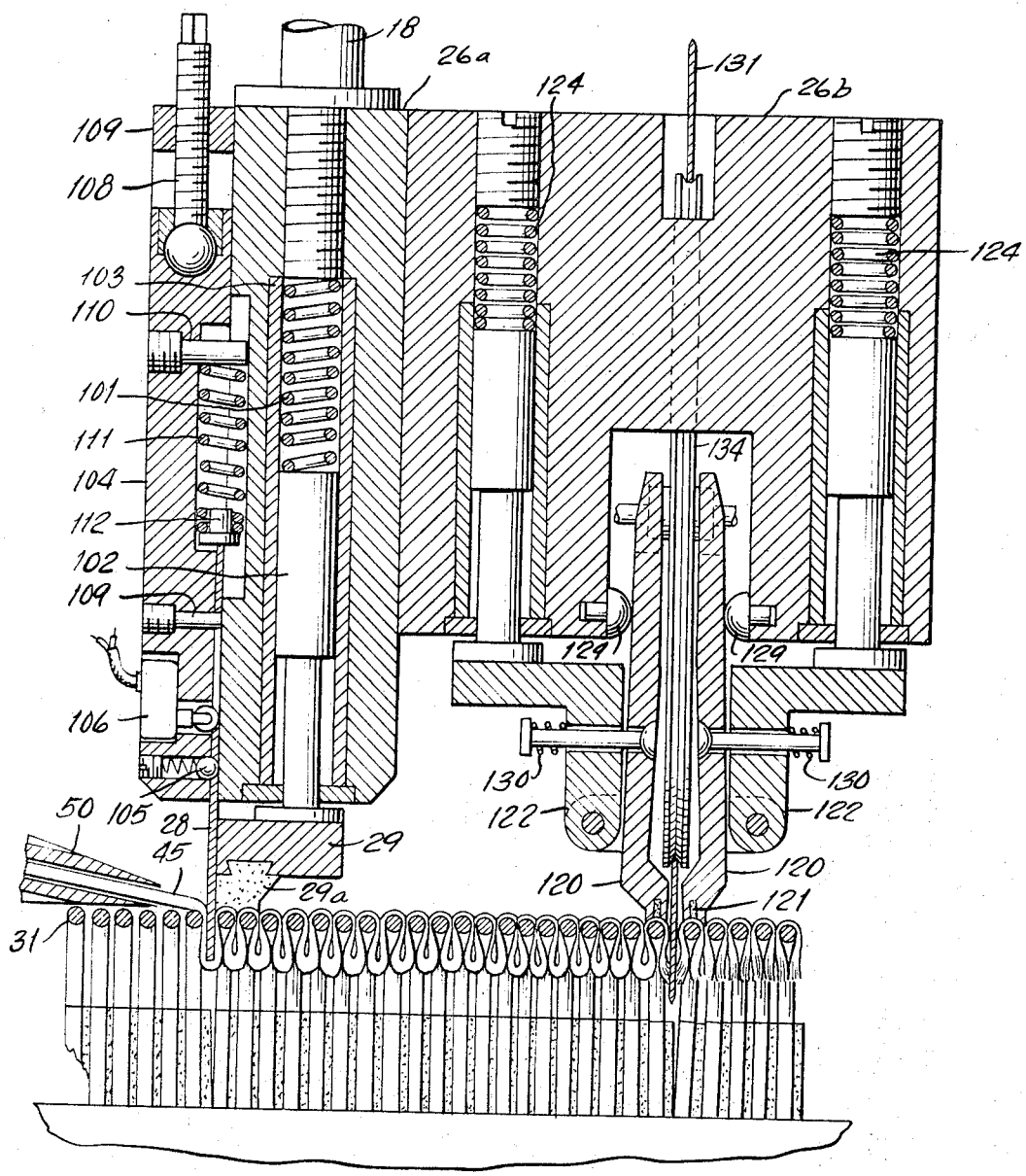

Referring now to FIGS. 3, 4 and 5 which illustrate principally the loop-forming operation, yarn 45 moves over guide roller 48a which is carried on housing 100 of adjustable comb or reed 49 through guide plates 50. When the array of loop-forming members 31 is positioned with respect to blade 28 such that a space between loop-forming members 31 is available directly beneath blade 28, carrier beam 26a is moved downwardly by push rod 18 carrying with it presser foot 29 and presser foot head 29a which is made of suitable, long wearing resilient material. As carrier beam 26a descends presser foot head 29a comes into contact with looped portions of yarn 45 and presses looped yarn portions 45 against the top of loop-forming members 31 as illustrated in FIG. 4. Upon continued downward movement of carrier beam 26a the upper end of presser foot 29 is urged against spring 101 carried within carrier beam 26a by piston 102 fixed to presser foot 29 and operative within cylinder 103 provided within carrier beam 26a. Accordingly, continued downward movement of carrier beam 26a, after presser foot head 29a comes into contact with yarn 45 disposed on top of loop-forming members 31, results in the compression of spring 101 within cylinder 103, yarn 45 being firmly held between the top of loop-forming members 31 and presser foot head 29a.

Blade 48 is located and retained on carrier beam 26a by means of a plurality of slidably adjustable blocks 104 fixed to carrier beam 26a and which are provided with spring loaded ball detents 105 which snap and feed into cooperating depressions in blade 28 and thereby serve to determine the position of blade 28 relative to blocks 104. As illustrated microswitch 106 is provided to arrest the movement of blade 28, such as by shutting off the power driving main shaft 14 and push rod 18 when blade 28 encounters an obstruction. Further, as illustrated, blocks 104 are adjustable vertically relative to carrier beam 26a by means of adjusting ball screw 108 which is threadedly mounted in lug 109 carried fixed to carrier beam 26a. By vertically adjusting ball screw 108 the depth of penetration of blade 28 between loop-forming members 31 can be altered, thereby altering the depth of the looped yarn formed between loop-forming members 31. Pin 107 provided within blocks 104 cooperates with pin 110 which, together with plug 112, holds spring 111 and plug 112 to retain blade 28 in position relative to carrier beam 26a as carrier beam 26a descends. In the event blade 28 during the downward movement of carrier beam 26a encounters an obstruction, such as might occur due to the misalignment of blade 28 relative to the array of loop-forming members 31 so that blade 28 encounters the top of loop-forming members 31, spring 111 is compressed and blade 28 tends to move upwardly relative to carrier beam 26a tripping microswitch 106 and bringing the machine to a stop until the cause of the misalignment between blade 28 and loop-forming members 31 is corrected.

Upon the formation of a row of looped yarn between loop-forming members 31 by the entry of blade 28 to the space between adjacent loop-forming members carrier beam 26a is raised lifting both blade 28 and presser foot 29 and presser foot head 29a out of contact with the looped yarn on the top of loop-forming members 31. These elements then describe the upper half of their elliptical path and then descend once more in the manner described hereinabove in correct relationship and synchronization as the next space between adjacent loop-forming members appears beneath blade 28. Blade 28 together with presser foot 29 and presser foot head 29a then again descend to form the next row of looped yarn between loop-forming members 31.

It will readily be appreciated by those skilled in the art of pile fabric manufacture, particularly as carried out by tufting, that by "back-robbing" of yarn selectively from previously formed loops within the array of loop-forming members 31 decorative high-low loop patterns or a resulting textured pile fabric may be produced in the practice of this invention. By the substitution of a conventional pattern attachment feed system for the supply of yarn 45 to the loop-forming operation the amount of yarn supplied to the loop-forming operation may be less than that required to form a loop to the full depth required by the penetration of blade 28 between loop-forming members 31. In such an arrangement presser foot head 29a will permit the balance yarn required to be borrowed or "back-robbed" from the previously formed looped yarn in the array of loop-forming members which has already passed under blade 28. The "back-robbing" technique permits the utilization of existing pattern attachments and techniques in the practice of this invention to produce patterned or textured pile fabrics or carpeting.

Further, by suitable means, not shown, such as by mounting adjustable comb or reed 49 on a transverse slideway, reed 49 which controls the end count and pile density in the resulting produced pile fabric, can be varied to increase or decrease the density of end count of the yarn moving therethrough or the adjustable reed, itself, may be reciprocated transversely with the result that long straight lines of loops which would normally appear in the finished pile fabric may be broken up and randomized. An infinite variety of pattern effects is therefore capable of being produced in the pile fabric manufactured in accordance with this invention.

Referring again to FIGS 3, 4 and 5, and also to FIGS. 6, 7 and 8 of the drawings, these figures illustrate primarily the loop-cutting operation in accordance with this invention. As illustrated therein carrier beam 26b is fixed to carrier beam 26a and therefore moves in synchronism therewith. Upon the downward stroke of carrier beam 26a, which also moves carrier beam 26b, carrier beam 26b moves downwardly to bring pre-openers 120 which are provided with resilient inserts 121 into contact with the looped yarn on top of loop-forming members 31. Pre-openers 120 are swingably mounted in pivot yokes 122. Upon contact with the looped yarn on top of loop-forming members 31 the downward movement of pre-openers 120 is arrested. The downward movement of carrier beam 26b, however, continues compressing springs 124 which are adjustably set within carrier beam 26b by means of threaded plugs 125. Springs 124 are compressed within carrier beam 26b as carrier beam 26b moves downwardly by the action of piston 126 which bears against the bottom of springs 124. Piston 126 is fixed to rod 128 which bears upon pivot yokes 122.

The upper end of pre-openers 120 is beveled and extends within an opening provided within carrier beam 26b. Hardened steel ball inserts 129 are provided within the opening in carrier beam 26b within which pre-openers 120 project and bear upon the beveled surface of pre-openers 120. As carrier beam 26b moves downwardly compressing springs 124 hardened steel ball inserts 129 ride upon the beveled surfaces of pre-openers 120 causing the lower ends of pre-openers 120 to swing outwardly against the urging of pre-loaded springs 130 and separating the adjacent looped yarn-covered, loop-forming members 31 which are in contact with the bottom of pre-openers 120.

As the bottom ends of pre-openers 120 swing out spreading apart loop-forming members 31 knife blade 131 descends therebetween entering the thus-opened space between the adjacent loop-forming members 31 and cuts the looped yarn therebetween. As illustrated, knife blade 131 is carried on and moves with carrier beam 26b by means of shaft 132 and sheaves 134. The sequence of pre-openers 120 contacting the yarn-covered loop-forming members 31, spreading loop-forming members 31 to permit the entry of knife blade 131 therebetween and the withdrawal and subsequent upward movement of knife blade 131 from between loop-forming members 31 and pre-openers 120, as carrier beam 26b moves downwardly and upwardly, is illustrated in FIGS. 6, 7 and 8.

It is thus seen that as carrier beam 26b is raised knife blade 131 is raised from between loop-forming members 31 and the bottom portions of pre-openers 120 brought together as steel inserts 129 ride up pre-openers 120 to the beveled surfaces thereof. Upon continued upward movement of carrier beam 26b, pre-openers 120 are lifted from contact with yarn-covered loop-forming members 31. Carrier beam 26b upon completion of its upward movement is then in position to again move downwardly in synchronism with carrier beam 26a so that loop-forming and loop-cutting operations are carried out substantially simultaneously during the next downward excursion of carrier beams 26a and 26b, respectively.

FIGS. 9a and 9b illustrate the loop-cutting apparatus essentially in the form of a self-contained attachment as employed in the apparatus in accordance with this invention. As already described herein the loop-cutting apparatus comprises carrier beam 26b which is mounted on and fixed to carrier beam 26a which actuates the loop-forming operation. Accordingly, carrier beam 26b moves downwardly and upwardly in synchonism with carrier beam 26a with the result that the loop-cutting operation performed by the apparatus associated with carrier beam 26b is carried out simultaneously with the loop-forming operation carried out by the apparatus associated with carrier beam 26a, all as described hereinabove.

Carrier beam 26b extends transversely across the array of loop-forming members 31, as illustrated, the array of loop-forming members 31 being carried on moving endless conveyor chain 30. The actual loop-cutting is effected by endless knife blade 131 which is carried on guide sheaves 134 fixed to carrier beam 26b by means of shaft 132 and lock nut 133 and driven by drive sheave 135. Drive sheave 135 is driven by motor 136 and flexible belt 138 made of suitable resilient material. Preferably, motor 136 is mounted on a stationary support although, if desired, it may be mounted by means, not shown, fixed to carrier beam 26b so as to move in unison with carrier beam 26b.

As illustrated, endless knife blade 131 driven by drive sheave 135 moves on guide sheaves 134 and between guide rollers 139 which are fixed to carrier beam 26b by suitable means, such as projecting lugs 140. The upper portion of endless knife blade 131 moves through cut-out portions of carrier beam 26b and the lower portion of blade 131 moves between pre-openers 120. Vertically adjustable mounting 141 provided with vertical setting control knob 141a is provided on carrier beam 26b for holding and positioning conical grinding wheels 142 supported by holder 141b against the cutting edge of knife blade 131, either continuously or intermittently, to effect sharpening of the cutting edge thereof.

Knife blade 131 is under sufficient tension to eliminate any objectionable sag. For example, in a machine calling for the production of endless pile fabric of 15-foot width an endless knife blade having the cross section dimensions ¾" x 0.025" would require a tension of about 100 pounds to eliminate sag. Desirably, the lower portion of knife blade 131 is positioned so as to descend more deeply between loop-forming members than loop-forming blade 28 so as to assure cutting of all the loops formed between loop-forming members 31. Since knife blade 131 is positioned laterally from loop-forming blade only a short, fixed distance, the system for assuring that loop-forming blade 28 descends between adjacent spaced loop-forming members also assures that cutting blade 131 descends between adjacent loop-forming members since any pitch error over this small, fixed distance separating loop-forming blade 28 and knife blade 131 would be negligible.

As illustrated in FIG. 9a, in order to pass around reasonably small sheaves, knife blade 131 is rotated or twisted 90° when approaching and leaving each end sheave, such as drive sheave 135, by means of free-turning guide rollers 139.

FIGS. 10, 11, 12 and 13 illustrate the array and assembly of the loop-forming members in accordance with this invention. Loop-forming members 31 comprise an upper cylindrical element 31a and a lower slat-like element 31b. Upper element 31a is supported and spaced from lower element 31b by means of a plurality of post elements 31c. Lower element 31b which is shown as having a rectangular cross section is generally a slat-like or bar-like element and carries with it or comprises or is made up of magnetic elements 31d spaced along the length thereof. In a presently preferred embodiment loop-forming members 31 have magnetic elements 31d fixed or otherwise adhesively attached to one side of lower element 31b. With lower element 31b made up of magnetic, permeable material, such as magnetically permeable steel, it is thus seen that the array of loop-forming members 31 illustrated in FIG. 10 is magnetically held together without the need for any external force to keep the array in order. Accordingly, the array of loop-forming members 31 is, in effect, self-energizing. This feature of holding the array of loop-forming members 31 together by magnetic forces wherein the magnetic forces are generated by the loop-forming members themselves comprises an essential element of this invention.

A further feature of this invention is the use of post elements 31c to space the upper element 31a from the lower element 31b thereby providing between adjacent loop-forming members 31 ample space for the looped yarn therebetween with the result that adjacent loop-forming members 31 can accommodate a wide variety of yarn thicknesses without causing overpacking between adjacent loop-forming members 31 during the loop-forming operation.

As illustrated in FIG. 10 the magnetic, self-energizing feature characterizing the array of loop-forming members is provided by means of adhesive plastic magnetic separator strips, such as Minute-Man flexible magnetic strip material manufactured by Magnetic Aids, Inc., of New York, N.Y. Such magnetic strip material is made up of magnetic particles embedded in a flexible plastic matrix which is adhesively fastened to one face or side of lower element 31b of loop-forming members 31 with the result that the magnetic strip material or magnetic element 31d is, in effect, sandwiched between two lower elements 31b of loop-forming members 31. The magnetically permeable material making up lower element 31b of loop-forming members 31 serves as a shunt to improve the magnetic forces which hold together the array of loop-forming members. If desired, to reduce weight, loop-forming members 31 may be made substantially only of lightweight metal, such as aluminum, which might be clad with a magnetically permeable material, such as steel, on the side surface thereof to which magnetic element 31d is attached.

In accordance with the arrangement illustrated in FIG. 10, each pair or adjacent loop-forming members are self-energizing with the magnetic attractive forces holding together adjacent loop-forming members and the whole array and serving to hold the looped yarn therebetween after the loop-forming operation has been carried out. Also, in effect, adjacent loop-forming members 31 act as though they were hingedly attached at the bottom during the loop-forming operation and accordingly accommodate during the loop-forming operation a wide variety of yarn thicknesses.

The array of loop-forming members 31 is mounted on channel strip member 150 encircling conveyor system 11 carrying the array of loop-forming members 31. Channel strip member 150 is made of resilient, flexible material, such as nylon or high durometer neoprene or the like and is provided with channels 151 extending along the length thereof. Each loop-forming member 31 is keyed to channel strip member 150 by means of spring clip 152, the upper portion of which is attached to bottom element 31b of loop-forming members 31 and the bottom portion of which is keyed within coopertaing channel 151 of channel strip 150. As indicated clip 152 can be snapped into position within channel 151 of channel strip 150. Also, as indicated, the position of clip 152 keying alternate loop-forming members 31 is staggered. Also, desirably, as illustrated, the position of alternate post elements 31c of loop-forming members 31 is staggered. By this arrangement post elements 31c and clip 152 cause minimal interference with the looped yarns formed between loop-forming members 31 making up the array. Channel strip 150 is secured to two or more roller chains 30 depending upon the width of the pile fabric to be produced. Screws 154 fasten channel strip member 150 to roller chain 30 which comprises undersized rollers 155 and split clamps 156 which are provided with an arcuate upper contour similar to the arc made as split clamps 156 pass over drive sprockets 32.

As will be apparent to those skilled in the art in the light of the foregoing disclosure, many modifications, substitutions and alterations are possible in the practice of this invention without departing from the spirit or scope thereof.

I claim:

1. A method for producing a pile fabric, such as carpeting, rugs and the like, which comprises disposing yarns on loop-forming members, said loop-forming members being positioned transversely with respect to said yarns, depressing said yarns between said loop-forming members to form loops of yarn therebetween, said loop-forming members being magnetically attracted to each other and held together magnetically in side-by-side contacting relationship such that when said loops of yarn are formed between said loop-forming members said loops of yarn tend to be locked between said loop-forming members due to the magnetic forces acting therebetween.

2. A method in accordance with claim 1 wherein said loops are cut after said loops are formed.

3. A method in accordance with claim 1 wherein film-forming material is applied onto the surfaces of the yarn portions disposed and supported on said loop-forming members, the thus-applied film-forming material serving to bind together the looped yarns and to serve as a backing therefor.

4. A method in accordance with claim 1 wherein adhesive material is applied onto the yarn portions disposed and supported on said loop-forming members, said yarn portions making up the bases of the thus-formed loops and applying backing material to the adhesive coated yarn portions.

5. A method in accordance with claim 4 wherein said loops of yarn between said loop-forming members are cut substantially immediately after said loops are formed.

6. A method in accordance with claim 4 wherein said loops of yarn are cut just prior to applying said adhesive material.

7. Apparatus useful for producing a pile fabric comprising an array of loop-forming members, said loop-forming members being disposed in side-by-side, parallel, contacting relationship and being magnetically attracted to each other and held together in said array, means for supplying warp material over and transversely with respect to said array of loop-forming members and means for depressing said warp material between a pair of adjacent loop-forming members.

8. Apparatus in accordance with claim 7 including means for cutting the thus-formed loops of yarn.

9. Apparatus in accordance with claim 7 including means for applying adhesive material to the surfaces of said warp material on said loop-forming members after said warp material has been depressed therebetween to form said loops.

10. An array of loop-forming members useful in apparatus for the manufacture of non-woven pile fabrics comprising an array of slat-like elements disposed in side-by-side, parallel, contacting relationship, said elements of said array being magnetically attracted to each other and held together in said array.

11. A loop-forming member useful in apparatus for the manufacture of non-woven pile fabrics comprising a slat-like element having magnetic material attached to one side thereof, said slat-like element being made of a material capable of being magnetically attracted by said magnetic material.

12. A loop-forming member in accordance with claim 11 wherein said element is provided with upright members disposed along the length thereof and supporting a separate, elongated member spaced from said slat-like element.

13. A method for producing a pile fabric, such as carpeting, rugs and the like, which comprises supplying and disposing yarn on loop-forming members, said loop-forming members being positioned transversely with respect to said yarns and being formed in a closed loop array, said loop-forming members being magnetically attracted to each other and held together in said array magnetically in side-by-side contacting relationship, continuously moving said loop-forming members in the path of said closed loop array and intermittently depressing said yarns between said loop-forming members of said array to form loops of yarn therebetween such that when said loops of yarn are formed between said loop-forming members said loops of yarn tend to be locked between said loop-forming members of said array due to the magnetic forces acting therebetween.

14. A method in accordance with claim 12 wherein binding material is applied onto the surfaces of the yarn portions disposed and supported on said loop-forming members, the thus-applied binding material serving to bind together the looped yarns and removing the thus-formed, bound loops from said array.

15. Apparatus for producing a pile fabric comprising a closed loop array of loop-forming members, said loop-forming members being disposed in said array in side-by-side, parallel, contacting relationship and being magnetically attracted to each other and held together in said array, means for continuously moving said loop-forming members in the path of said array, means for supplying warp material over and transversely with respect to said array of loop-forming members, means for intermittently depressing said warp material between adjacent loop-forming members to form loops of yarn therebetween, means for applying binding material onto the surface of the yarn portions disposed and supported on said loop-forming members, the thus-applied binding material serving to bind together the looped yarns and means for removing the thus-formed bound loops from said array.

16. Apparatus in accordance with claim 15 wherein means are provided for cutting said loops formed between said loop-forming members before said binding material is applied to said yarn portions.

17. Apparatus in accordance with claim 16 wherein said cutting means comprises a metal band adapted for insertion between said loop-forming members to sever the looped yarn held between said loop-forming members.

18. Apparatus in accordance with claim 17 wherein said cutting means is operated substantially simultaneously with said means for depressing said warp material between the adjacent loop-forming members.

19. Apparatus in accordance with claim 17 wherein means are provided for moving apart said loop-forming members before insertion of said cutting means therebetween.

References Cited

UNITED STATES PATENTS

| | | | |
|---|---|---|---|
| 2,116,048 | 5/1938 | Smith | 156—435 X |
| 2,136,828 | 11/1938 | Signoret | 139—4 |
| 2,834,806 | 5/1958 | Jamrogowicz | 139—7 X |
| 3,354,914 | 11/1967 | Carrigan et al. | 139—399 |
| 3,379,222 | 4/1968 | Fleischer et al. | 139—6 |
| 3,309,252 | 3/1967 | Adler | 156—435 X |

HAROLD ANSHER, *Primary Examiner.*

U.S. Cl. X.R.

156—435, 510, 269; 139—2, 399; 223—37; 270—83; 308—3.9